United States Patent [19]

Okamoto et al.

[11] Patent Number: 5,092,643
[45] Date of Patent: Mar. 3, 1992

[54] AUTOMOBILE BUMPER

[75] Inventors: Harutaka Okamoto, Nishikasugai; Tetuya Miyano, Inazawa, both of Japan

[73] Assignee: Toyoda Gosei Co, Ltd., Nishikasugai, Japan

[21] Appl. No.: 604,203

[22] Filed: Oct. 29, 1990

[30] Foreign Application Priority Data

Oct. 30, 1989 [JP] Japan .................. 1-127620

[51] Int. Cl.⁵ .................................. B60R 19/02
[52] U.S. Cl. ........................... 293/155; 293/102
[58] Field of Search ............... 296/194, 901; 293/102, 293/120, 154, 155

[56] References Cited

U.S. PATENT DOCUMENTS

| | | | |
|---|---|---|---|
| 1,937,197 | 11/1933 | Halladay | 293/102 |
| 3,342,000 | 9/1967 | Cripe | 293/155 X |
| 4,095,831 | 6/1978 | Hagiwara et al. | 293/155 X |
| 4,109,951 | 8/1978 | Weller | 293/155 X |
| 4,272,115 | 6/1981 | Stock | 293/155 |
| 4,364,591 | 12/1982 | Bien | 293/102 |
| 4,488,745 | 12/1984 | Stokes | 293/155 |
| 4,533,166 | 8/1985 | Stokes | 293/155 X |
| 4,579,755 | 4/1986 | Takeda et al. | 293/102 X |

FOREIGN PATENT DOCUMENTS 62-177564 11/1987 Japan .

*Primary Examiner*—Margaret A. Focarino
*Assistant Examiner*—Joseph D. Pape
*Attorney, Agent, or Firm*—Cushman, Darby & Cushman

[57] ABSTRACT

An automobile bumper having an outer shape that forms a design surface. A mount is vibratorily welded to a back surface opposite to the design surface such that a fixture is fixed between the bumper body and the mount. The mount is melted by frictional vibration with the bumper body and so as to be integrally joined with that bumper body. Because the depth of the bumper body material being melted during vibrational welding does not reach the design surface, no shrinkages, uneven luster, welds or the like are produced on the design surface of the bumper body.

8 Claims, 7 Drawing Sheets

AUTOMOBILE BUMPER

BACKGROUND OF THE INVENTION

1. Field of the Invention

The present invention relates to automobile bumpers such as corner bumpers used on an automobile and more particularly, as it relates to an automobile bumper fixing mechanism.

2. Description of the Related Art

A conventional automobile bumper is described in Japanese Laid-Open Utility Model Publication No. Sho 62-177564. This bumper includes side parts, which extend along the side surface of a car body, and a longitudinally elongated support, provided on the side surface of the body so as to be positioned at the back of the side part of the bumper. The support has a T-shaped cross-section whereby fitting grooves are formed on its upper and lower sides between it and the side surface of the car body. The support has rotation-prohibiting projections which fit into position setting holes provided on the side surface of the car body whereby the support can be bolted to that side surface. A pair of oppositely projecting support pieces, each having hook-shaped cross-section, are provided on the upper and lower portions of the back surface of the bumper side part. The extreme bent portions of these support pieces are inserted into the fitting grooves and held between the support and the side surface of the body with fastening bolts.

The bumpers having the structure described above, however, have an elongated longitudinal support disposed on the side surface of the body and positioned on the back of the side part of the bumper. Therefore, these bumpers are generally thick in cross-section and are subject to shrinkages, uneven luster, welds and the like being generated on the exposed design surface after assembly.

Another known bumper arrangement includes sheet-metal sheet plates buried as inserts. These metal plates are used in order to improve a strength of support structure being provided. However, the appearance of the finished design of such a bumper suffers because the synthetic resin at the location where the metallic sheet plate is present does not contract, but the remaining bumper portions made of the same synthetic resin do contract.

SUMMARY OF THE INVENTION

In view of the above, one object of the present invention is to provide an automobile bumper in which no shrinkages are generated on the exposed design surface of the bumper whereby the appearance of the bumper is improved.

The automobile bumper of the present invention includes a bumper body, formed with an outer shape defining the design surface, a mount, vibratorily welded to a bumper surface opposite the design surface, and a fixture which is fixed between the bumper body and the mount. Further the automobile bumper of this invention may also include a guide serving to specify a fixing position for the mount, said guide begin provided on the surface opposite to the design surface.

In addition, the mount being vibratorily welded to the surface opposite to the design surface may include a bolt attaching portion formed at the end thereof. Finally, the automobile bumper of the present invention may have the surface, opposite to the design surface, made flat where the mount of the bumper body is vibratorily welded, and further, have a thickness that gradually changes so as to be thicker away from the welded surface.

BRIEF DESCRIPTION OF THE ACCOMPANYING DRAWINGS

FIG. 2(c) is a cross-sectional view of a fixture used in the first preferred embodiment.

FIG. 5(c) is a cross-sectional view showing a fixture used in the second preferred embodiment.

Figure 6:
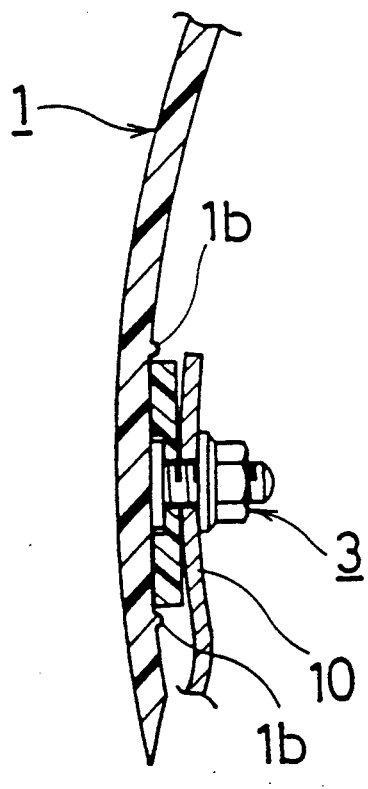
Figure 7:
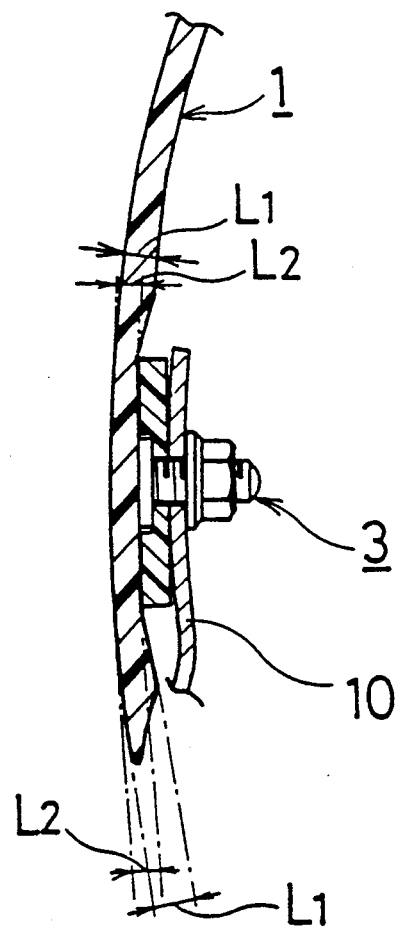
Figure 8:
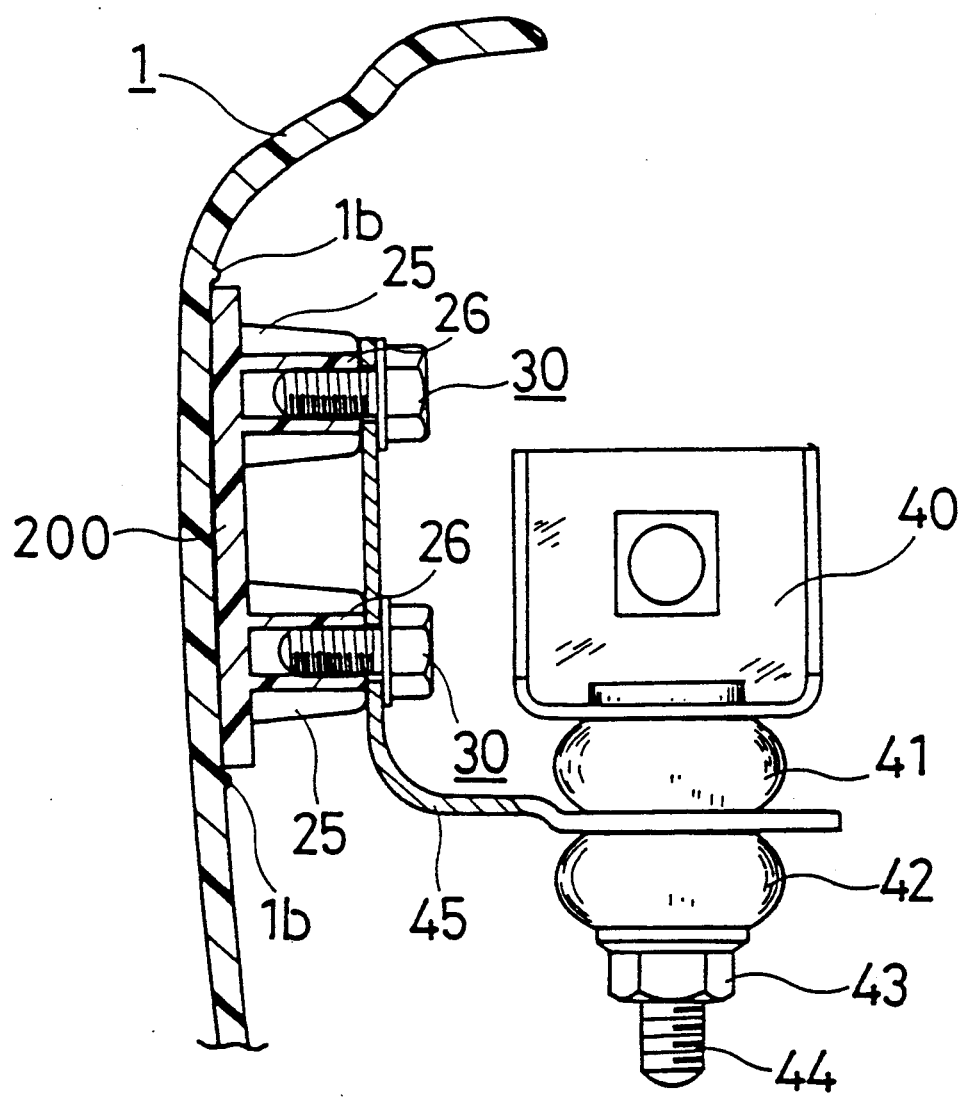

FIG. 6 is a partial cross-sectional view showing a mount and a fixture used in a third preferred embodiment of this invention. FIG. 7 is a partial cross-sectional view showing a mount and a fixture used in a fourth preferred embodiment of this invention. FIG. 8 is a partial cross-sectional view showing a mount and a fixture used in a fifth preferred embodiment of this invention.

DESCRIPTION OF THE PREFERRED EMBODIMENTS

Some preferred embodiments of this invention will be described with reference to the drawings as follows.

Figure 1:
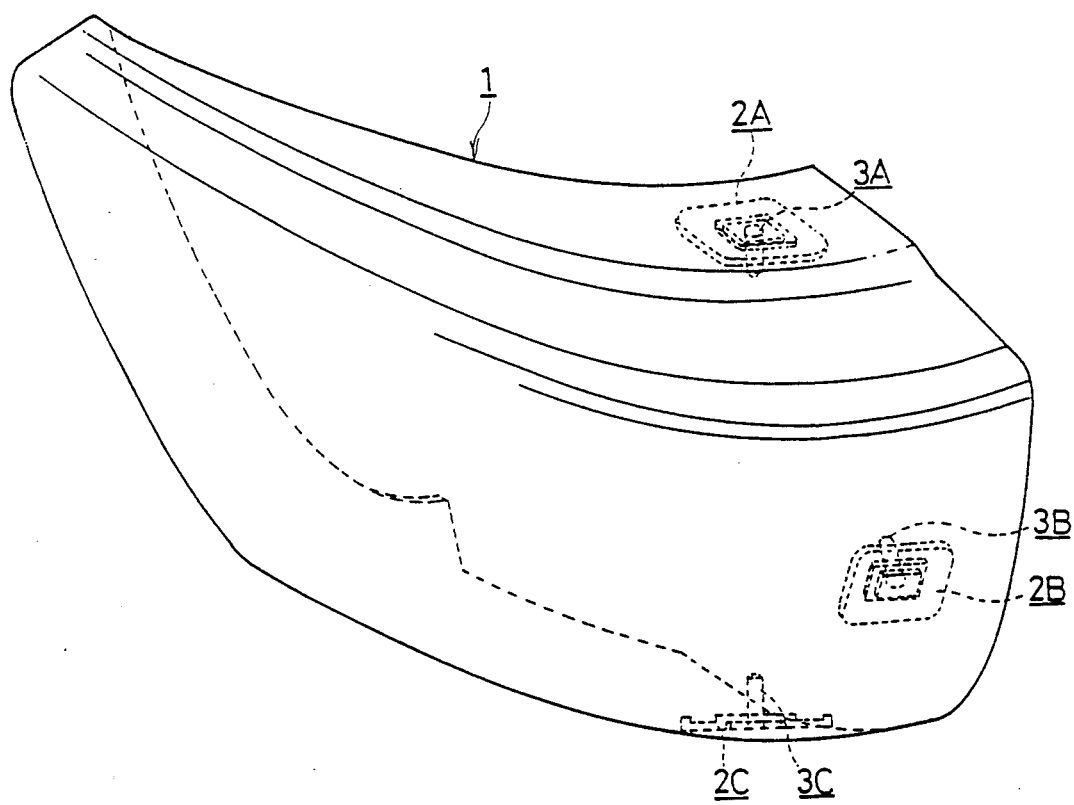
FIG. 1 is a perspective view of an automobile bumper of a first preferred embodiment of the present invention.

FIG. 1 is a perspective view showing an automobile bumper of a first preferred embodiment of the present invention.

In this figure, a corner bumper body I of the present embodiment is to be fitted to a front side of an automobile body. The bumper body 1 may be formed by an injection molding of a synthetic resin such as denatured polypropylene or the like. The corner bumper body 1 made with a substantially uniform thickness and its outer surface defines a design surface. Mounts 2 (2A, 2B and 2C), constructed of synthetic resin such as denatured polypropylene or the like, are fixed to a back surface opposite to the design surface of the corner bumper body I by vibration welding. Basically, the same material as that of the bumper body 1 is selected for the mounts 2. The heads of the bolts 3 (3A, 3B and 3C) are fixed at the center of each at the mounts 2 (2A, 2B and 2C) between the bumper body 1 and the mounts 2 (2A, 2B and 2C). The bolts 3 are used as fixtures in the present embodiment.

Figure 2A:
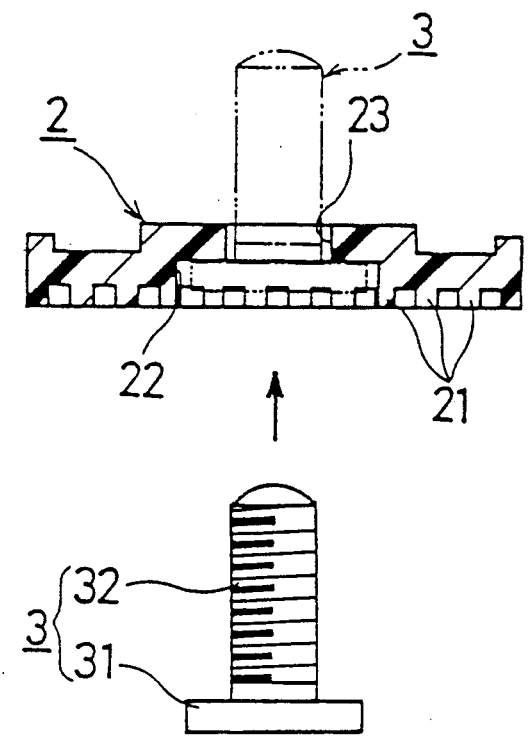
FIG. 2(a) is a cross-sectional view showing the mount of the first preferred embodiment.
Figure 2B:
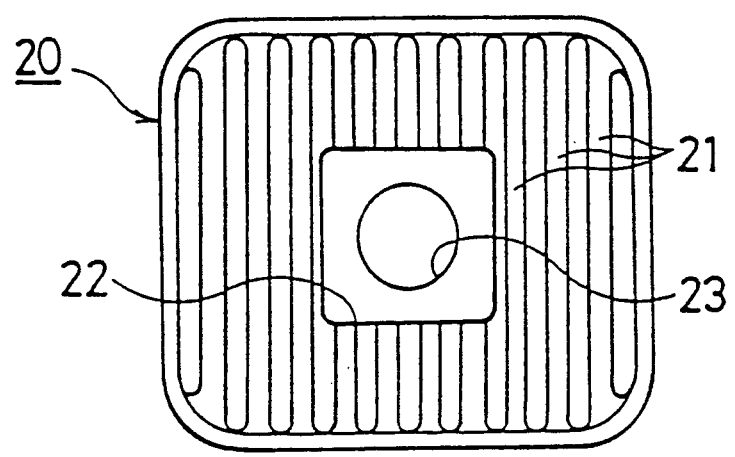
FIG. 2(b) is a rear view of the same mount.

Each of the mounts 2 (2A, 2B and 2C) are constructed as is shown in FIG. 2(a). FIG. 2(a) is a cross sectional view of the mount 2, and FIG. 2(b) is a rear view thereof. FIG. 2(c) is a cross-sectional view of the fixture 3.

The mount 2 has a predetermined number of ribs 21 formed on its bottom part. The mount 2 has an accommodating recess 22 at the center of its bottom surface for fitting a head 31 of the bolt 3. A depth of the recess 22 is determined such that the end surface of the head 31 is positioned near the bottoms of grooves which form the ribs 21. A through-hole 23 is formed at the center of the recess 22. The shaft of each of the bolts 3 is inserted into the through-hole 23.

The ribs 21 serve to increase the contact pressure per unit area of the mount 2 when the mount 2 is vibratorily welded. During vibratory welding, part of the melted ribs 21 enters between the ribs 21 so as to increase the contact area thereof relative to the back surface of the bumper body 1. It further decreases the amount of melted material that will leak from the mount 2 during welding. Usually, in vibration welding, the vibration is applied in the longitudinal direction of the ribs 21. Therefore, part of the melted ribs 21 also enters the recess 22 so as to fix the head 31 of the bolt 3 within the recess 22. Thus, the bolt 3 is fixed between the bumper body 1 and the mount 2.

Figures 3A, 3B:
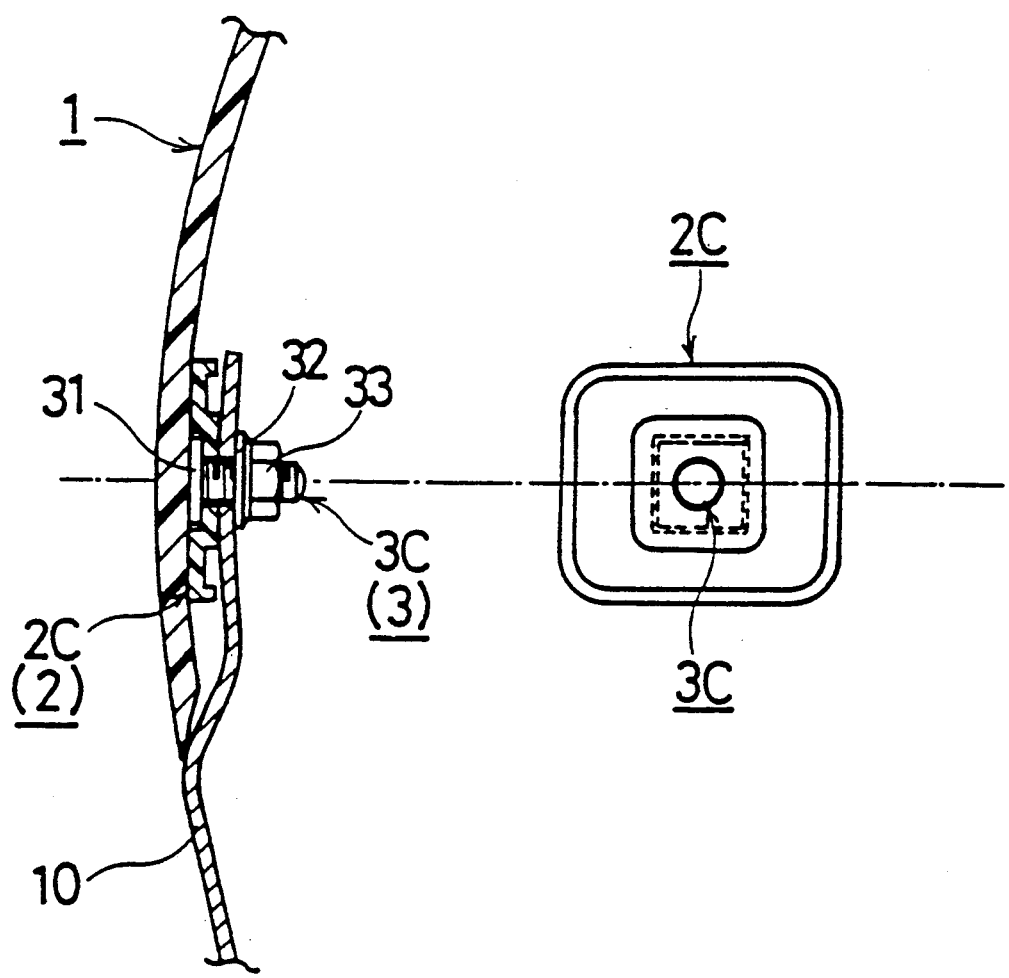
FIG. 3(a) is a partial cross sectional view showing a mount and a fixture of the automobile bumper of a first preferred embodiment of this invention.
FIG. 3(b) is a partial front elevational view showing a mount and a fixture of the automobile bumper of the first preferred embodiment.

Assembling operation will be described with reference to FIG. 3(a), which is a partial cross sectional view showing the mount and the fixture of the corner bumper of the present embodiment, and FIG. 3(b), which is a partial front elevational view showing the mount and the fixture. This description will be made with reference to the mount 2C and the bolt 3C, but would have equal application to the mounts 2A and 2B and the bolts 3A and 3B.

The bolt 3C is inserted into the through-hole 23 of the mount 2C. The mount 2C is pressed toward the back surface of the bumper body 1. Vibration is applied to the mount 2C along the length of the ribs 21. This vibration is applied by a vibration welding machine such as the one made by BRANSO of West Germany. Thus, the mount 2C is vibratorily welded to the back surface of the bumper body 1, whereby the head 31 of the bolt 3C is fixed between them.

In this way, the bolt 3C is fixed to the bumper body 1 via the mount 2C. The bolt 3C is inserted into a connecting hole formed at the end of a center bumper 10 positioned at a front center part of the automobile body. Then, a nut 33 is engaged with the bolt 3C to fasten and cause the corner bumper body 1 and the center bumper 10 to be firmly connected. As described above, the corner bumper of the present embodiment has the bumper body 1 formed with an outer shape defining the design surface, the mounts 2 (2A, 2B and 2C) vibratorily welded to the back surface of the bumper body 1, and the fixtures, such as the bolts 3 (3A, 3B and 3C) or the like, fixed between the bumper body 1 and the mounts 2 (2A, 2B and 2C).

Since the mount 2 (2A, 2B, 2C) is vibratorily welded to the back surface of the bumper body 1, the depth of the bumper body 1 being melted in welding does not reach the design surface. Normally, the depth of the bumper body being melted is only several millimeters or less. Thus, no shrinkages, uneven luster, welds or the like are generated, and the appearance of the design surface is improved. In particular, since a metallic sheet is not buried as an insert in the bumper body 1, a uniform contraction of the material comprising the bumper body 1 is attained, and no shrinkages, uneven luster, welds or the like are generated on the design surface. Thus, in case of the design surface being colored, no irregular color is produced at the surface.

Further, because the mount 2 (2A, 2B, 2C) is vibratorily welded to the back surface of the bumper body 1, the back surface of the bumper body 1 and the mount 2 (2A, 2B, 2C) become integral in their melted state. Thus, it is possible to increase the strength of the bumper body 1 at the connecting area where the mount 2 (2A, 2B, 2C) is integrally joined to the back surface of the bumper body. Accordingly, the bumper body 1 can be kept in a stable fixed state.

Figure 4A:
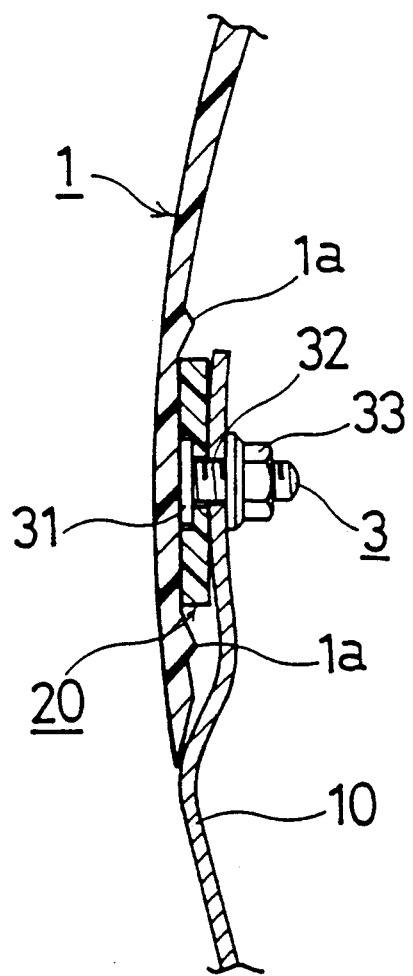
FIG. 4(a) is a partial cross sectional view showing a mount and a fixture of an automobile bumper of a second preferred embodiment of this invention.
Figure 4B:
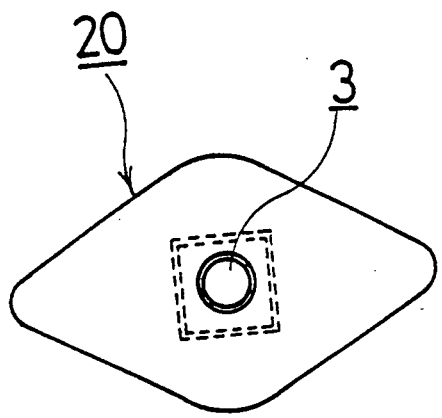
FIG. 4(b) is a partial front elevation view showing a mount and a fixture of an automobile bumper of a second preferred embodiment.
Figure 5A:
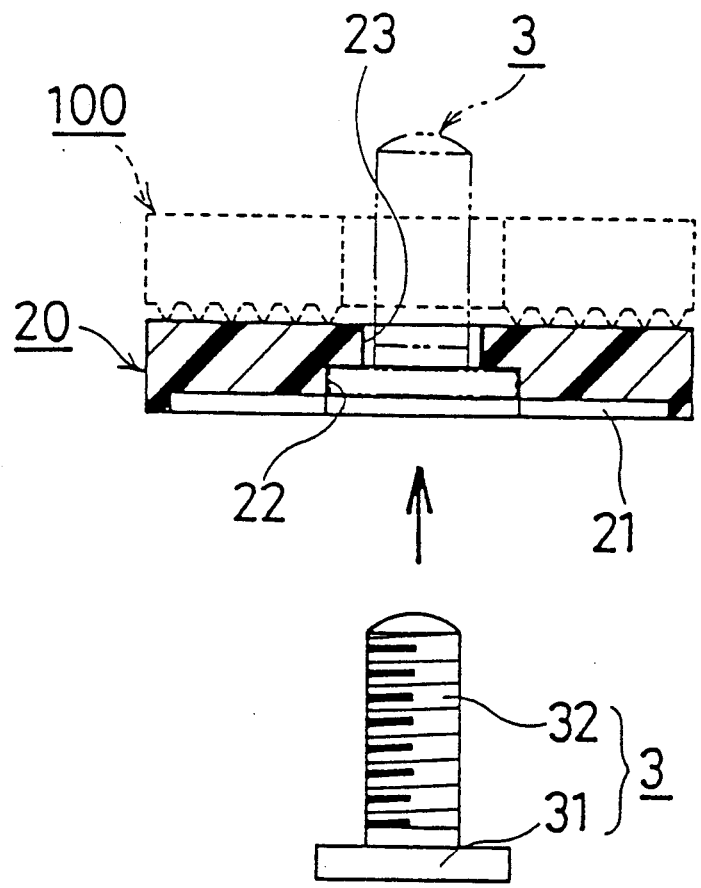
FIG. 5(a) is a cross-sectional view showing a mount used in the second preferred embodiment of this invention.
Figure 5B:
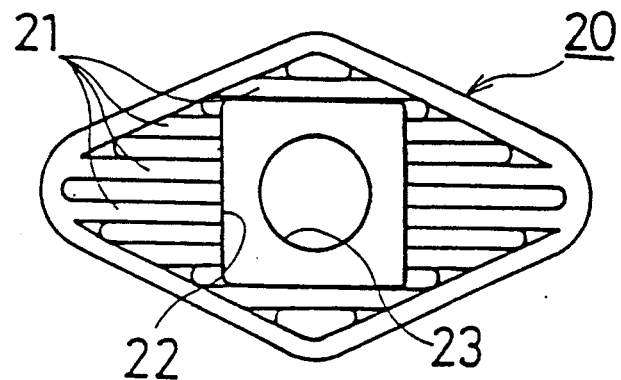
FIG. 5(b) is a rear view showing a mount used in the second preferred embodiment.

FIGS. 4(a) and (b) and 5(a),(b) and (c) illustrate a second preferred embodiment of an automobile bumper of the present invention. FIG. 4 (a) is a partial cross sectional view showing a mount and a fixture of the automobile bumper of the second embodiment. FIG. 4(b) is a partial front elevational view of the bumper. FIG. 5(a) is a cross be used in the second embodiment. FIG. 5(b) is a rear view of it. In the figures, the same reference numerals and symbols as those of the first embodiment denote the same or corresponding elements as those of the first embodiment.

In the figures, four independent linear guides 1a having a substantially triangular cross section are provided. Each guide 1a is integrally formed on the back surface of the corner bumper body 1 opposite to the design surface. The guides 1a are disposed adjacent to and in parallel with the peripheral edges of the mount 20. The guides 1a actually used have inclined surfaces which are formed to move gently incline toward and away from the mount 20. Their heights are also lower than those shown in FIG. 4. Preferably, the guides 1a are of such height that permit their location to be confirmed either visually or by touch. This is done to avoid variations in the thickness of the bumper body 1 to avoid any shrinkages, uneven luster, welds or the like on the design surface that may result through their formation. The guides 1a are exaggerated somewhat in FIG. 4(a) for illustration purposes.

The mount 20 is constructed as shown in FIGS. 5(a), (b) and (c). Namely, the head of the bolt 3, which acts as the fixture of the present embodiment can be fixed at the center of the mount 20 between the bumper body 1 and the mount 20. The mount 20 has a predetermined number of ribs 21 formed on its bottom and includes an accommodating recess 22 provided at the center of the bottom surface for holding the head 31 of the bolt 3. The depth of the recess 22 is determined such that the end surface of the head 31 is positioned near the bottoms of the grooves defined by the ribs 21. A through-hole 23 is formed at the center of the recess 22. The shaft 32 of the bolt 3 is inserted into the hole 23.

In particular, the difference between the mount 2 of the first embodiment and the mount 20 of the second embodiment consists of the fact that the mount 2 is substantially a square plate with rounded corners while the mount 20 is substantially a parallelogram plate with round corners, a so called rhombic plate. Another difference is that an annular groove is formed on the upper surface of the mount 2 while the upper surface of the mount 20 is flat.

The upper surface of the mount 20 is made to be flat according to the type of a jig used in applying the vibration while pressing and holding the mount 20 in the vibration welding machine. For the mount 20 of the present embodiment, a jig having a knurled surface or a jig 100 formed at its one surface with needle-like projections is used shown as the dotted lines in FIG. 5(a). This is compared to the jig being used with the mount 2 of the first embodiment. The groove of a jig being used there (not shown) fits with the annular groove provided on the upper surface of the mount 2. Vibration is applied while pressing and holding the mount 2. The mount 20 is formed into substantially a parallelogram plate with round corners in accordance with a shape of a contacting area surface of the body 1 to which the mount 20 is joined. The shape of the mounts, however, may be varied as required.

In the second preferred embodiment, the bolt 3 is inserted into the through-hole 23 of the mount 20. Then, the mount 20 is positioned at the connecting area of the bumper body 1 via the four guides 1a on the back surface of the bumper body 1. Thereafter, the mount 20 is pressed by the jig 100 and vibration is applied to the mount 20 along the length of the rib 21. Thus, the mount 20 is vibratorily welded to the back surface of the bumper body 1 with the head 31 of the bolt 3 being fixed between them. After this operation, the bolt 3 is fitted into a connecting hole formed at the end of the center bumper 10 positioned at a front central part of the automobile body. Then, a nut 33 is threaded onto the bolt 3 to connect the corner bumper body 1 and the center bumper 10.

In the present embodiment, in case of performing the vibration welding operation, the mount 20 can be positioned at the connecting area of the back surface of the body 1 by using the guides 1a arranged on the back surface, so that the working efficiency can be improved. Moreover, it is easily placed because, the back surface of the bumper body 1 is made discontinuous by the guides 1a thus, it is known by the guides 1a where to joint the mount 20. Furthermore, when the mount 20 slightly rides over any one of the four guides 1a and is vibrated, a part of the guides 1a and the mount 20 is melted together through their contact friction and they can become integrally joined. This means that, even if some positional errors are encountered when a plurality of mounts 20 are simultaneously vibratorily welded, the work is not affected thereby.

In the aforesaid preferred embodiment, the four guides 1a having substantially a triangular cross section are formed on the back surface of the bumper body 1 around the connecting area for the mount 20. However, as is shown in FIG. 6, guides 1b in the form of small projections may be formed on the back surface of the bumper body 1 as an alternative. The projection 1b is of such dimension so as to not cause any shrinkages, uneven luster, welds or the like on the design surface of the bumper body 1. One or more guides 1b may be disposed around the connecting area of the body 1 to which the mount 20 is to be fitted. Preferably, they are arranged around the connecting area so as to restrict the two dimensional movement of the mount 20. It is also possible to adopt linear guides 1b in the form of fine projections.

In the present embodiment, one or more small projections 1b are formed around the connecting area for the mount 20. Therefore, the back surface of the bumper body 1 is made discontinuous by the guides 1b. Thus, it is very easy to position the mount 20 at the desired connecting area on the back surface of the body I via the guides 1b. As a result, its working efficiency can be improved.

FIG. 7 is a partial cross sectional view showing a mount and a fixture to be used in the fourth preferred embodiment of the present invention. In this preferred embodiment, the wall thickness of the bumper body I where the mount 20 is to be connected to the back surface opposite to the design surface, is established as L2. The wall thickness of the bumper body I at the areas apart from the connection area is established as L1 with L2<L1 whereby the difference between the wall thicknesses L1 and L2 defines a guide. Moreover, as shown in FIG. 7, because the design surface may have a curvature and the bottom of the mount 20 is flat, a gap may exist between the central part of the mount 20 and the inside curvature of the bumper body I. For this reason, the wall thickness of the bumper body 1 is constructed such that the back surface in the connection area is made flat. Thus, parallel movement (vibration) of the mount 20 is facilitated with a uniform pressure.

The fourth preferred embodiment therefore also obtains the benefits of the guides 1a of the second embodiment shown in FIG. 4. Accordingly, there are no shrinkages, uneven luster, welds and the like on the design surface of the bumper body 1 in this embodiment. Thus, an appearance of the design surface can be improved.

FIG. 8 is a partial cross sectional view showing a mount and a fixture to be used in the fifth preferred embodiment of the present invention.

In this embodiment, a mount 200, made of synthetic resin, has cylindrical bolt attaching portions 26 vertically installed at its four corners, respectively. Each of the bolt attaching portions 26 includes reinforcing plates 25 which extend radially from the circumferential surface. The plates 25 integrally reinforces the upper surface of the mount 200 and the circumferential surface of the bolt attaching portion 26 against outward forces acting on the bolt attaching portion 26. Of course, as described earlier, a predetermined number of ribs (not shown) are formed on the bottom of the mount 200.

The mount 200 is pressed against the connection area surface opposite to the design surface of the bumper body 1. Vibration is then applied to the mount 200 along the length of the ribs 25. Thus, the mount 200 is vibratorily welded to the back surface of the bumper body 1, thereby making the body 1 and the mount 200 into one body. On the car side, a base 40 is attached to the car body. A bolt 44 is inserted into the base 40. Insulators 41 and 42 are fitted to the bolt 44. A bracket 45 is held between the insulators 41 and 42. The bracket 45 is rigidly fixed with a nut 43 so as to cause the base 40 to be integrally connected with the bracket 45.

Attaching bolts 30 are screwed into the bolt attaching portions 26 to hold the bracket 45 between the attaching bolts 30 and the bolt attaching portions 26.

It can be readily understood from FIG. 8 that the mount 200, which is to be vibration-welded to the bumper part, is not limited to the structures shown in FIGS. 4, 6 and 7 in which the head 31 of the bolt 3 is held between the mount and the connection area surface of the bumper body 1. As in the fifth preferred embodiment, it is possible to use the mount 200 itself, which has its end surface entirely contacted with and joined to the bumper body I, for attaching them to an automobile body. The present embodiment is provided with the bumper body 1 formed with an outer shape defining a design surface, guides 1b for specifying the attaching position of the mount 200 to the back surface of the bumper body 1, and the mount 200 vibratorily welded to the back surface of the bumper body 1 and formed with the bolt attaching portions 26 at the end thereof. Accordingly, in the present embodiment, the head 31 of the bolt 3 as the fixture is not held between the bumper body 1 and the mount 200. Instead, the mount 200 with the bolt attaching portions is 10 directly connected to the bumper body 1. Then, the attaching bolts 30 or tapping screws are driven thereinto to hold other members fixed to the automobile body. The number of the attaching bolts 30 or tapping screws is not limited to one, but may be plural. Also in this embodiment, the mount 200 is vibratorily welded to the back surface of the bumper body 1 into one body. Therefore, the depth of the bumper body 1 being melded in welding does not reach the design surface, but it is normally less than several millimeters. As a result, no shrinkages, uneven luster, welds or the like are produced on the design surface of the bumper body 1. Thus, an appearance of the design surface can be improved.

The aforesaid preferred embodiments have been described with respect to the corner bumper body 1 having an outer shape as the design surface. However, the embodiments of the present invention are not limited to the aforesaid corner bumper body 1, but may be applied to an automobile bumper with an outer shape as a design surface.

The mounts 2, 20 and 200 vibratorily welded to the back surface of the bumper body 1, in the aforesaid preferred embodiments, are made of substantially a parallelogram plate. It is to be understood that the mount is not limited to that shape, and any shape can be selected. In addition, the bottom surface may have another structure, or have another shape of ribs 21 and/or accommodating recesses 22. In particular, for the vibration welding operation, it is possible to use any means for generating physical frictional force so as to carry out adhering work with its frictional force.

The aforesaid embodiments employ the bolts 3 as the fixture between the corner bumper body 1 and the mounts 2, 20 and 200. However, these fixtures are not limited to the bolts 30 in embodying the present invention, and other fixing means such as clips and the like can be used.

In addition, the guides for showing the fitting positions of the mounts 2, 20 and 200 on the back surface of the bumper body 1, in the aforesaid preferred embodiments, are formed by the guides 1a of substantially a triangular cross section, the guides 1b of small projections, and the guides constructed such that the wall thickness of the body 1 at the connection area, where the mount 20 is joined to the back surface, is L2 and the wall thickness at the other area apart from the connection area is L1 (L2<L1). However, in putting the present invention in practice, it is enough for the guides to have preferably such a variation in heights as can be confirmed either visually or by touch.

Moreover, the mount 200 has the bolt attaching portions 26 formed at the end and is vibratorily welded to the back surface of the bumper body 1 in the aforesaid embodiment. In other words, the mount 200 has threaded inserting holes for the attaching bolts 30. In constructing a device utilizing the concepts of the present invention another structure may be adopted whereby the bolts are directly threaded into the same material as that of the vibration-welded mount 200 or into other material.

As described above, the automobile bumper of the present invention has an automobile bumper body formed with an outer shape as a design surface, a mount vibratorily welded to the back surface opposite to the design surface of the bumper body, and a fixture fixed between the bumper body and the mount. Moreover, the mount is vibratorily welded to the back surface of the bumper body so as to make one body. As a result, the depth of the bumper body being melted does not reach the design surface. Accordingly, no shrinkages, uneven luster, welds or the like are produced on the design surface of the bumper body, and the appearance of the design surface can be improved. Further, because the mount is vibratorily welded to the back surface of the bumper body into one body, the mount and the back surface of the bumper body are integrally assembled to each other while being melted, and the strength of the area to which the mount is integrally fitted is increased. Thus, the bumper body can be kept in a stable fixed state. Further, since the fixture is fixed between the bumper body and the mount, selection of the fixture is easy as required.

Because the automobile bumper of the present invention makes use of bolts as the fixture, its cost is less expensive and it may have many applications in view of its strength. Also, because the present invention includes guides for indicating the attaching position of the mount, positioning of the mount is easily performed and its working efficiency can be improved. In addition, because the mount is formed with the bolt attaching portions at its end and vibratorily welded to the back surface of the bumper body, it is easy to mount the bumper by driving the bolts into the mount thereby simplifying the assembly and reducing the cost.

Finally, because the automobile bumper of the present invention is made such that the back surface of the bumper body is flat in the area where the mount is vibration welded, the thickness of bumper body gradually increases to a standard thickness away from the melting surface. As a result, the thickness of the bumper body at the connection area, where the mount is vibratorily welded, can be made thin. Further, no shrinkages are generated when the bumper body is formed. Furthermore, since the mount is vibratorily welded thereto to define one body, it is possible to increase the strength at the part of the bumper where the mount is joined and also to increase its mechanical strength.

What is claimed is:

1. An automobile bumper comprising:
a bumper body formed of a synthetic resin having an outer decorative surface and a back surface having a curved area opposite to said outer decorative surface, a part of said curved area being provided with a flat area;
a mount formed of synthetic resin having a weld surface planarly welded in its entirety to said flat area of said back surface by vibration welding, said mount having an attaching portion of substantially cylindrical shape; and
a fixture attached to said mount, said fixture is a bolt which can be secured to said attaching portion.

2. An automobile bumper according to claim 1, in which said bumper body has a guide serving to position said mount at an attaching position.

3. An automobile bumper according to claim 1 in which said mount includes a plurality of ribs on a bottom surface.

4. An automobile bumper comprising:

a bumper body having an outer decorative surface and a back surface opposite to said outer decorative surface;

a mount having a plurality of ribs on a bottom surface vibratorily welded to said back surface;

a fixture held between said bumper body and said mount; and a guide serving to position said mount on an attaching position on said back surface of said bumper body.

5. An automobile bumper according to claim 4, in which said fixture is a bolt and said mount has an accommodating recess provided at its bottom for accommodating a head of said bolt.

6. An automobile bumper comprising:

a bumper body having an outer decorative surface and a back surface opposite to said outer decorative surface;

a mount vibratorily welded to said back surface;

a fixture held between said bumper body and said mount; and a guide serving to position said mount on an attaching position on said back surface of said bumper body, said guide is a projection arranged around said attaching position of said bumper body and said projection has a height gradually increasing to a predetermined standard thickness at locations remote to a surface to be welded.

7. An automobile bumper comprising:

a bumper body having an outer decorative surface and a back surface opposite to said outer decorative surface, said back surface has a flat area for welding said mount and a thickness of said bumper body at said flat area is smaller than a standard thickness of said bumper body;

a mount vibratorily welded to said back surface;

a fixture held between said bumper body and said mount; and a guide serving to position said mount on an attaching position on said back surface of said bumper body.

8. An automobile bumper comprising:

a bumper body of synthetic resin having an outer decorative surface and a back surface having a curved area opposite to said outer decorative surface, a part of said curved area being provided with a flat area;

a mount of a synthetic resin having both a top and bottom surface and a plurality of ribs formed on the bottom surface, said ribs being adapted to melt during vibration welding so as to define a planar weld surface between said mount bottom surface and said bumper back surface flat area opposite to said outer decorative surface;

a fixture attached to said mount; and a guide serving to position said mount on said flat area of said back surface of said bumper body.

* * * * *